US006246207B1

(12) United States Patent
VanSistine et al.

(10) Patent No.: US 6,246,207 B1
(45) Date of Patent: Jun. 12, 2001

(54) METHOD AND APPARATUS FOR CONTROLLING AN INDUCTION MOTOR

(75) Inventors: Thomas G. VanSistine, Menomonee Falls, WI (US); Stephen J. Dellinger, Covington, OH (US); Jerry A. Rudiak, Raleigh, NC (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/204,594

(22) Filed: Dec. 3, 1998

Related U.S. Application Data

(60) Provisional application No. 60/090,721, filed on Jun. 26, 1998.

(51) Int. Cl.[7] .................................................. H02P 7/42
(52) U.S. Cl. ...................... 318/801; 318/778; 318/807; 318/438; 318/254; 318/801; 318/802
(58) Field of Search ..................................... 318/254, 439, 318/138, 778–818; 307/64

(56) References Cited

U.S. PATENT DOCUMENTS

| | | | |
|---|---|---|---|
| 3,114,093 | 12/1963 | Fricke | 318/221 |
| 3,207,967 | 9/1965 | Athey | 318/221 |
| 3,219,898 | 11/1965 | Schaefer | 318/202 |
| 3,264,542 | 8/1966 | Burdett | 318/220 |
| 3,753,069 | 8/1973 | Newton | 318/440 |
| 3,778,634 * | 12/1973 | Hanrihan | 307/64 |
| 3,875,483 | 4/1975 | Farr | 318/213 |
| 4,006,430 * | 2/1977 | Meyer-Ebrecht | 331/65 |
| 4,024,444 | 5/1977 | Dewan et al. | 318/227 |
| 4,030,008 | 6/1977 | Buckle et al. | 318/220 |
| 4,041,360 | 8/1977 | Morris | 318/221 |
| 4,330,817 | 5/1982 | Avar et al. | 363/96 |
| 4,333,042 | 6/1982 | Kawada et al. | 318/811 |
| 4,408,268 | 10/1983 | Peters et al. | 363/62 |
| 4,409,533 | 10/1983 | Kawabata | 318/807 |
| 4,409,534 | 10/1983 | Bose | 318/811 |
| 4,417,193 | 11/1983 | Hirata | 318/803 |
| 4,419,615 | 12/1983 | Muto et al. | 318/811 |
| 4,445,167 | 4/1984 | Okado | 363/56 |
| 4,447,786 | 5/1984 | Saar et al. | 318/811 |
| 4,449,175 | 5/1984 | Ishii et al. | 363/26 |
| 4,451,112 | 5/1984 | Hattori et al. | 318/778 |
| 4,466,052 | 8/1984 | Thrap | 363/41 |
| 4,491,778 | 1/1985 | Knox et al. | 318/803 |
| 4,519,022 | 5/1985 | Glennon | 363/41 |
| 4,546,422 | 10/1985 | Okado | 363/41 |
| 4,566,289 | 1/1986 | Iizuka et al. | 62/228.4 |
| 4,591,964 | 5/1986 | Kemstedt | 363/24 |
| 4,651,079 | 3/1987 | Wills | 318/811 |
| 4,706,180 | 11/1987 | Wills | 363/132 |
| 4,737,701 | 4/1988 | Hoemann et al. | 318/772 |
| 5,212,438 * | 5/1993 | Miyazaki et al. | 318/805 |
| 5,252,905 | 10/1993 | Wills et al. | 318/807 |
| 5,350,992 * | 9/1994 | Colter | 318/807 |
| 5,514,943 | 5/1996 | Shapess | 318/722 |
| 5,581,133 * | 12/1996 | Smith et al. | 307/64 |
| 5,689,168 | 11/1997 | Bogwicz et al. | 318/772 |
| 5,883,490 * | 3/1999 | Moreira | 318/807 |
| 6,037,725 * | 3/2000 | Tolbert, Jr. | 318/110 |
| 6,078,160 * | 6/2000 | Cilluffo | 318/641 |
| 6,121,749 * | 9/2000 | Wills et al. | 318/811 |

* cited by examiner

*Primary Examiner*—Robert E. Nappi
*Assistant Examiner*—Tyrone Smith
(74) *Attorney, Agent, or Firm*—Michael Best & Friedrich LLP

(57) ABSTRACT

A method and apparatus for controlling a motor. The apparatus includes a voltage input; a half-bridge inverter connected the voltage input and to the motor to provide low speed excitation to the motor; and a circuit for selectively electrically connecting the voltage input to the motor and for selectively electrically disconnecting the inverter from the motor.

26 Claims, 5 Drawing Sheets

METHOD AND APPARATUS FOR CONTROLLING AN INDUCTION MOTOR

RELATED APPLICATIONS

This application claims priority, under 35 U.S.C. Section 119, of prior-filed, co-pending provisional application Ser. No. 60/090,721 filed Jun. 26, 1998.

BACKGROUND OF THE INVENTION

The invention relates to induction motors, and particularly to a method and apparatus for controlling an induction motor.

Previous methods and apparatus of controlling an induction motor incorporate the changing of speed taps or the use of triac controls, which simply provide an effective reduction in voltage or flux so as to cause the motor to run at a reduced speed by the nature of slip. Slip is generally a measurement of how much the movement of the rotor follows the excitation field, and is defined as the difference between the frequency of the excitation energy and the speed of the motor. While these controls provide adequate speed control, they do so at the expense of efficiency as the motor runs at a higher slip which is proportional to rotor conduction loss.

U.S. Pat. No. 5,252,905 a shows and describes such a controller for a motor. The controller uses a single phase pulse width modulated inverter to control the speed of the motor at speeds that are less than the full operating speed of the motor. The voltage applied to the motor is adjusted in direct proportion to the frequency output from the pulse width modulator. That is, a constant voltage to frequency ratio is maintained. This constant voltage to frequency ratio results in a constant torque output regardless of the speed of the motor.

SUMMARY OF THE INVENTION

It has been determined that the reduction of input power to a blower motor has a dramatic effect on increasing the Seasonal Energy Efficiency Ratio or ("SEER") of heating, ventilating, and air conditioning ("HVAC") equipment. It has also been determined that blower applications exist that do not require the full torque output (typically measured in cubic feet per minute ("CFM")) that an induction motor excited by sixty cycle voltage would provide. The purpose of the invention is to provide a low cost, "power efficient" way of reducing the indoor blower speed, and consequently, the indoor blower CFM and input power so as to realize an increase in overall system efficiency.

Accordingly, the invention provides a controller having a variable speed drive that provides an optimum reduced speed setting for the operation of the blower motor when less than full speed and full torque output are required. The controller includes an inverter and pulse width modulator connected to the inverter to control the inverter. The inverter includes a microprocessor to calculate a quadratic relationship between applied voltage and frequency rather than the constant voltage to frequency ratio of the prior art. The use of a quadratic control relationship between the applied voltage and the frequency reduces the torque output matching the fan law torque curve, resulting in a more efficient controller that requires fewer and lower cost, lower power rated parts.

The controller also incorporates the use of relays local to the controller. The relays allow the motor to be run using the variable speed excitation voltage (for reduced speed operation) and allow the inverter to be bypassed to excite the motor using sixty cycle line excitation voltage (for full speed operation). The ability to run the motor at full speed directly from the line voltage further reduces the power requirements of the components in the inverter. Because set reduced speed operating points are selected using a quadratic voltage to frequency relationship, the electronic components of the inverter can be sized for approximately ¼ the full rated horsepower.

This control concept is particularly effective in applications which follow a "cubed-law" power characteristic such as fans and pumps. In these applications, the power demanded by the load is a cubed function of the speed, that is: $y=CX^3$; wherein y is the power, and X is the speed of the motor. By reducing the speed in half, you reduce the power required by ⅛.

Various other features and advantages of the invention are set forth in the following drawings, description and claims.

Figure 1:
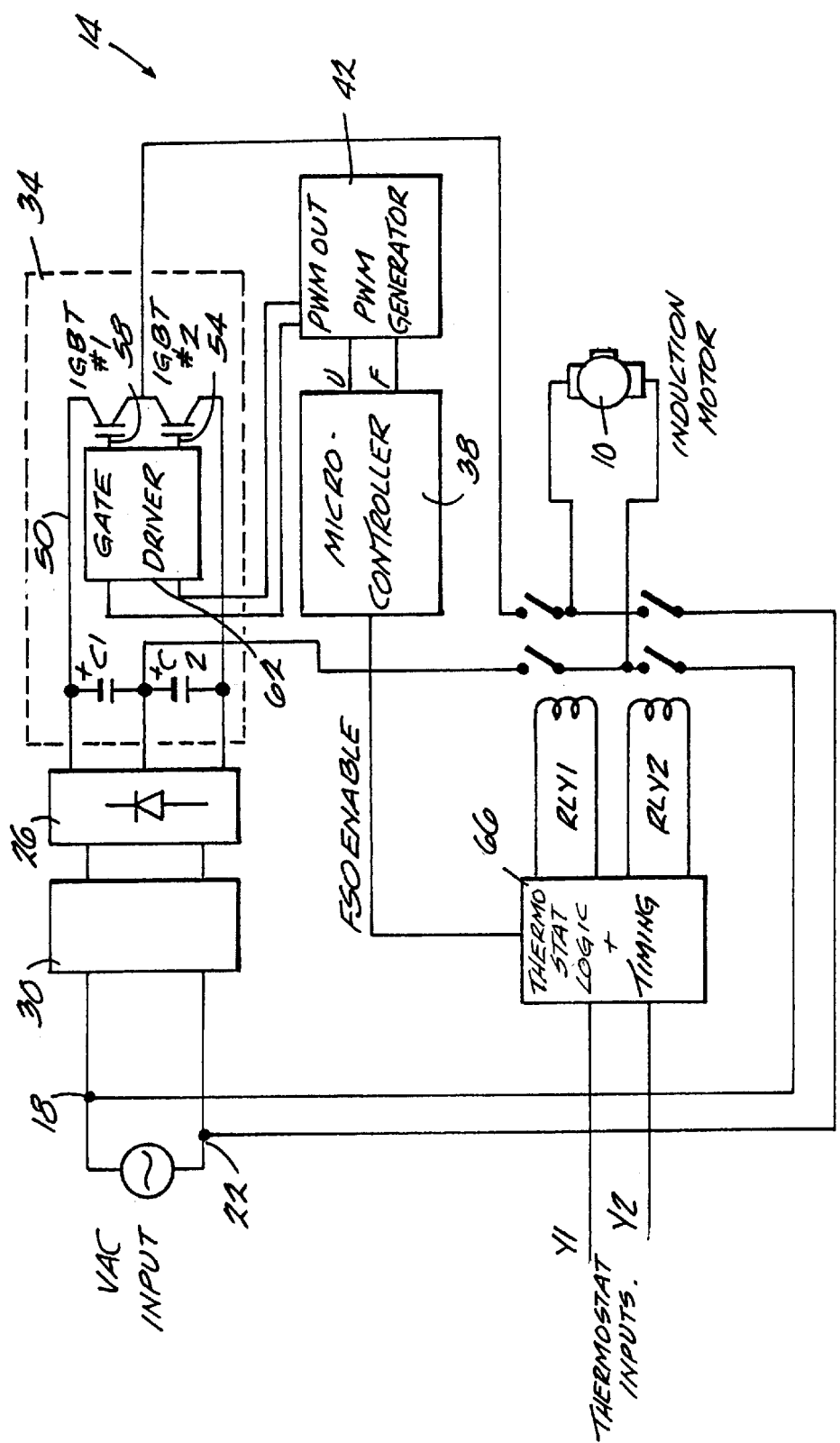
FIG. 1 is a block diagram form schematic illustration of an induction motor and a fixed speed drive controller embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION

FIG. 1 illustrates schematically an induction motor 10 and a controller 14 embodying the invention connected to the motor. While any single phase induction motor can be controlled using the controller, the induction motor 10 shown in the drawings and referred to in the description is a permanent split capacitor ("PSC") motor.

Figure 4:
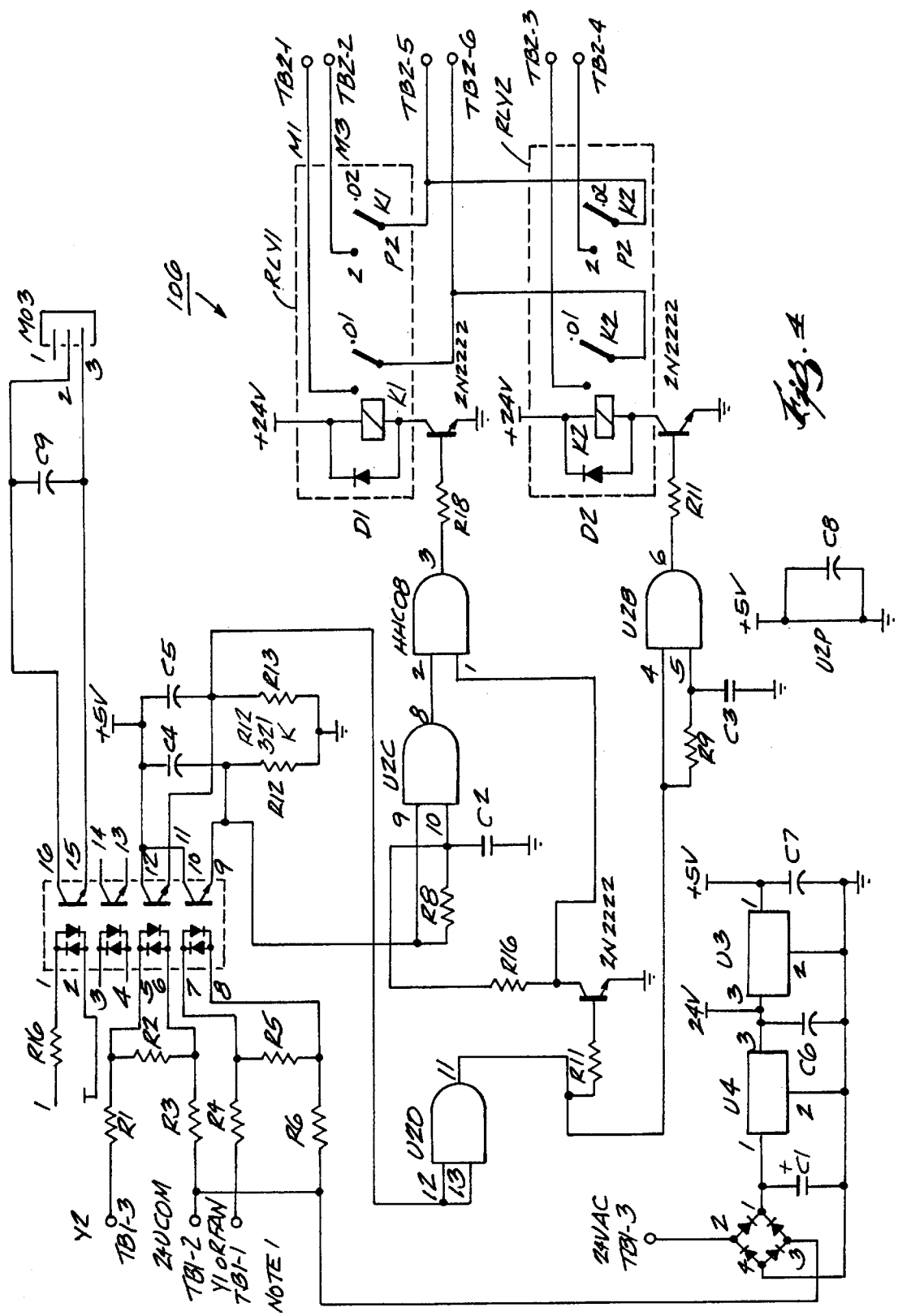
FIG. 4 is a schematic illustration of another embodiment of a thermostat logic and timing circuit of the fixed speed drive controller.
Figure 5:
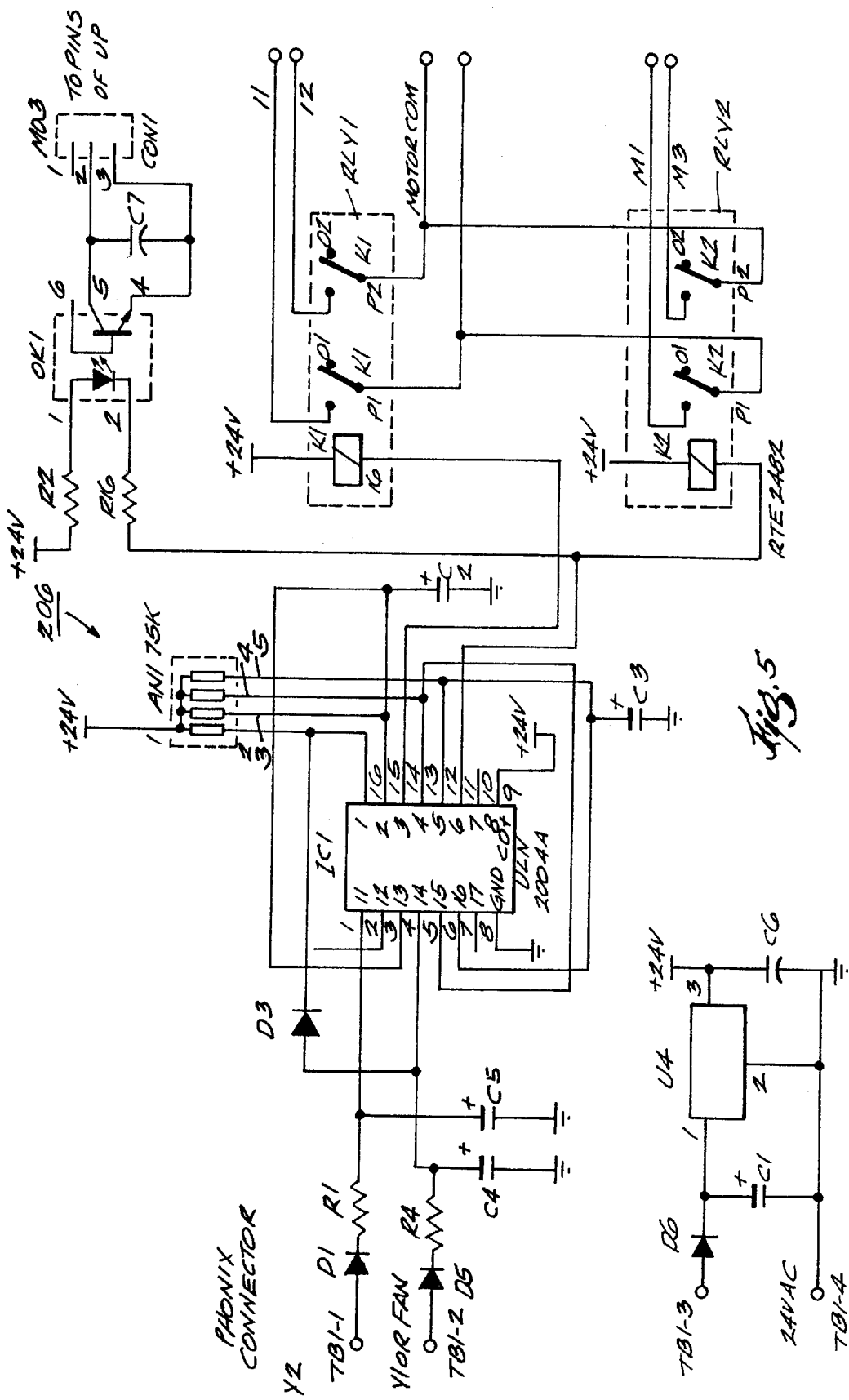
FIG. 5 is a schematic illustration of yet another embodiment of a thermostat logic and timing circuit of the fixed speed drive controller.

The controller includes power input terminals 18 and 22 adapted to be connected to a source of electrical power (shown as VAC Input). The power input terminals are selectively connected directly to the motor through relay RLY2. The controller also includes a full wave bridge rectifier 26 and an EMI filter 30 connected to the power input terminals 18 and 22. The EMI filter 30 is connected to the inverter 34, which is, in turn, selectively connected to the motor through relay RLY1. A micro-controller 38, and pulse width modulator PWM 42 are connected to the inverter 34 to control the output of the inverter 34. The relays are controlled by inputs from the thermostat, various embodiments of which are shown in FIGS. 4–6.

As shown in FIG. 1, the inverter 34 includes positive and negative voltage busses 50 and 54. Capacitors C1 and C2 are serially connected to one another between the voltage busses 50 and 54. Power switches IGBT1 and IGBT2 are serially connected to one another in a "half-bridge" configuration between the positive and negative busses 50 and 54 and in parallel with the capacitors C1 and C2. Power switches IGBT1 and IGBT2 each include a gate 58 connected to a gate driver 62. The gate driver 62, pulse width modulator 42 and micro-controller 38 control operation of the power switches IGBT1 and IGBT2. The inverter 34 is designed to operate efficiently at only one or perhaps only a few fixed, predetermined speeds that are less than the rated full operating speed at full line voltage. At these speeds, the micro-controller 38 calculates a quadratic relationship between applied voltage and frequency rather than the constant voltage to frequency ratio of the prior art. The use of a quadratic control relationship between the applied voltage and the frequency reduces the torque output matching the fan law torque curve, resulting in a more efficient controller that requires fewer and lower cost, lower power rated parts. As a result of the quadratic voltage-to-frequency control relationship, the motor requires approximately only half the voltage normally supplied during full speed operation.

Figure 2:
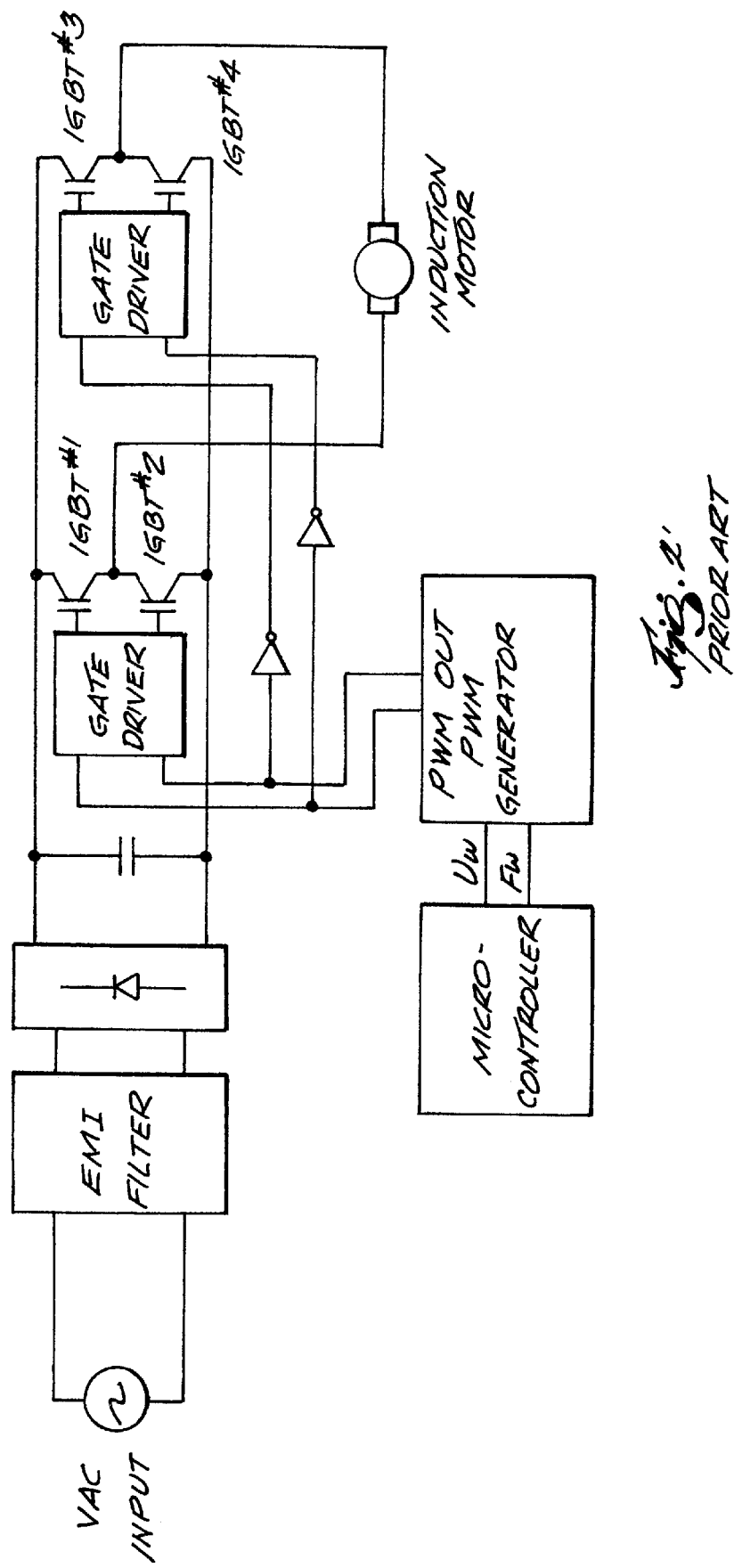
FIG. 2 is a block diagram form schematic illustration of the inverter used in connection with full range motor speed controllers of the prior art.

Due to the nature of this reduced speed/reduced voltage requirement, the inverter circuit of FIG. 1 uses fewer components and lower power, lower voltage components that are less expensive than the components required by the prior art. Ultimately, these two factors reduce the cost of the drive of FIG. 1 over prior art full frequency/full voltage range inverters such as the one illustrated in FIG. 2. The prior art circuit shown in FIG. 2 includes a second stage of power switches IGBT3 and IGBT4. Furthermore, because the inverter of FIG. 2 is designed to operate over the full range of frequency and voltage, the components of the inverter of FIG. 2 must be rated for higher power and higher current, and are therefore more expensive than the components used in the controller shown in FIG. 1.

Figure 3:
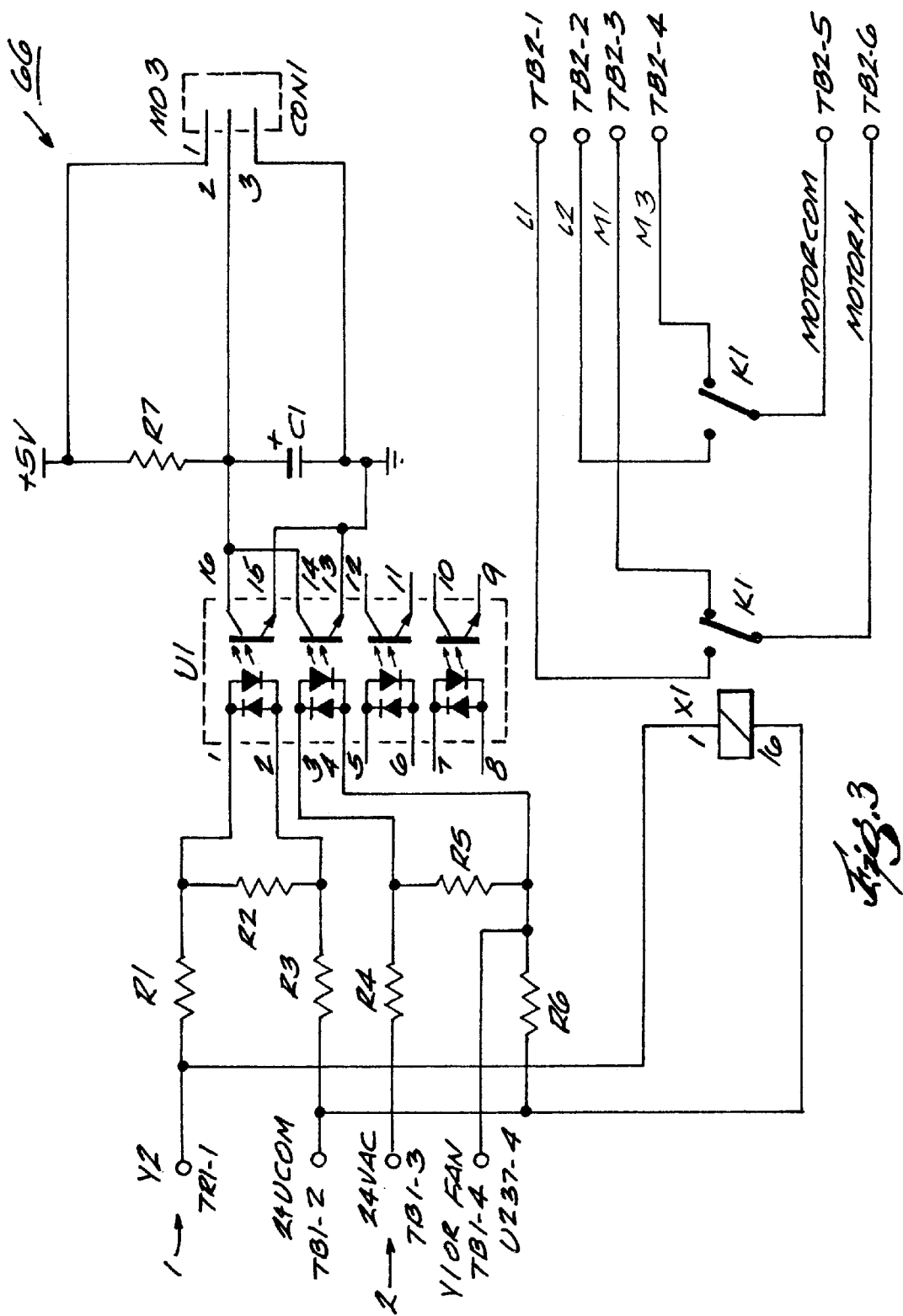
FIG. 3 is a schematic illustration of one embodiment of a thermostat logic and timing circuit of the fixed speed drive controller.

The controller shown in FIG. 1 also includes thermostat logic and timing circuitry 66 (see FIG. 3) having thermostat inputs Y1 and Y2. Thermostat inputs Y1 and Y2 connect to conventional 24 VAC inputs. The thermostat inputs Y1 and Y2 are used to select low speed or high speed operation.

FIG. 4 illustrates another thermostat logic and timing circuit 106 embodying the invention. Like parts are identified using like reference numerals. The thermostat logic and timing circuit 106 also includes timing means for ensuring that, when switching from low speed operation to full speed operation, a "break before make" condition exists whereby one relay is disabled (breaks) for a period of time necessary to let the motor's magnetic field collapse and before energizing the other relay (make). From experimental data, the time required for the magnetic field to decay is on the order of several hundred milliseconds, and is a function of motor size and design. The "break before make" timing of thermostatic logic and timing circuit 106 is equal to 700 msec.

The timing means allows the drive to deactivate its outputs before switching to the line in an attempt to protect the drive from possible switching transients in the relay. Switching transients can potentially occur during switching as current is interrupted from the inductive load (i.e., the motor). The interruption of current flow will usually result in arcing when using a mechanical switching means such as a relay. This arcing may damage the power switching output devices of the drive.

FIG. 5 illustrates another thermostat logic and timing circuit 206 that switches the relays RLY1 and RLY2 with "break before make" timing equal to 100 msec timing, at lower cost, and space than the circuit shown in FIG. 4. Like parts are identified using like reference numerals.

A secondary problem that needed to be overcome occurs when switching from the line driven (high speed) operating mode to the inverter driven (low speed) operating mode. The motor must slow down to at least the speed of the lower speed drive. If not, the motor will act as a generator, charging the bus capacitors and perhaps exceeding the capacitor voltage ratings. This condition may result in permanent damage to the capacitors. To eliminate the potential for this damage to occur, the drive is informed by the circuit shown in FIG. 5 that the motor is being switched from the line to the drive. A timing means in the form of a software delay was created to wait 3 seconds before starting the drive, allowing the fan load to slow the motor below the inverter drive frequency thus preventing the generating condition from occurring.

The thermostat logic and timing circuit 206 can be combined with the controller 14 to provide a total system solution to run a PSC motor in an HVAC application in both high and low speed operation, selectable by thermostat controls, in a very efficient manner.

Referring specifically to FIG. 5, circuit inputs Y1 and Y2 are 24 VAC signals from a thermostat controlling two stage heating. Input Y1 is energized if low speed operation is called for, and input Y2 is energized (usually along with Y1) when high speed operation is called for. Input Y2 will take precedence over input Y1, if active.

| Logic Truth Table: | | |
| --- | --- | --- |
| Y1 | Y2 | Motor speed |
| off | off | off |
| on | off | low speed |
| off | on | high speed |
| on | on | high speed |

In operation, inputs Y1 and Y2 are half wave rectified by diodes D5 and D4, respectively, and are filtered by RC filters formed by R4/C4 and R1/C5, respectively, to create a DC signal representing the state of the signal. Component IC1 is a single package containing seven separate, open collector (Darlington transistor) inverters with recirculation diodes connected to the collectors and common emitters connected to ground. Each DC signal is routed first through two inverters in IC1. The output of the second inverter is connected to a 75 Kohm resistor and a 10uf capacitor. At first, the capacitor does not carry a charge. When a DC signal becomes present, the output of the second inverter goes "high" and the 10uf capacitor charges. After about $\frac{1}{10}$th of a second the capacitor reaches the threshold of the third inverter thereby turning on the third inverter and energizing the corresponding relay RLY1. When the inputs Y1 or Y2 both switch to "low," the DC signal quickly decays, allowing the first inverter output to be pulled high, and thereby causing the second inverter to short (i.e. discharge) the 10 uF capacitor quickly. This turns off the third inverter so that the third inverter no longer energizes the relay coil and the relay RLY1 opens quickly. This timing scheme allows the relays RLY1 and RLY2 to be delayed by about 100 msec when turning on. However, relays RLY1 and RLY2 turn off much quicker, i.e., almost immediately.

In order to have input Y2 take precedence over input Y1, diode D3 discharges capacitor C4 (of input Y1's input filter)

when every input Y2 is present, thereby turning off quickly and keeping off the relay controlling input Y1. To inform the inverter that it is being selected to run, the signal to energize the relay RLY1 is optically coupled through optical coupler K1. Capacitor C7 provides noise filtering. Relays RLY1 and RLY2 switch both terminals of the motor 10 from line to the FSD. Diode D6, capacitors C1 and C6, and voltage regulator U4 provide a DC supply for the thermostatic logic and control circuit 206 from the same 24 VAC transformer which supplies power to the thermostat.

Various features and advantages of the invention are set forth in the following claims.

What is claimed is:

1. A controller for an electric motor, said controller comprising:
   a voltage input having a first voltage;
   a half-bridge inverter connected to said voltage input and to the motor to provide low speed excitation to the motor, said half-bridge inverter generating a second voltage less than said first voltage;
   a microcontroller and a pulse width modulator for generating a quadratic voltage-to-frequency relationship for operating the half-bridge inverter; and
   a control circuit for electrically connecting the voltage input directly to the motor to provide high speed excitation and for electrically disconnecting said half-bridge inverter from said motor.

2. A controller as set forth in claim 1 wherein said half-bridge inverter includes no more than two power switches.

3. A controller as set forth in claim 1, and further comprising a first relay for connecting the motor to said half-bridge inverter for low speed operation, and a second relay for connecting the motor to said voltage input for full speed operation.

4. A controller as set forth in claim 3, wherein said control circuit comprises timing means for generating a time delay to control said first and second relays in a break-before-make format so that said first and second relays are never closed at the same time.

5. A controller as set forth in claim 4 wherein, when switching from low speed operation to full speed operation, said time delay is approximately one-hundred milliseconds.

6. A controller as set forth in claim 5 wherein, when switching from full speed operation to low speed operation, said time delay is approximately three seconds.

7. A controller for an electric motor, said controller comprising:
   a voltage input;
   an inverter connected to said voltage input and to the motor to provide low speed excitation to the motor;
   a first relay for connecting the motor to said inverter for low speed operation;
   a second relay for connecting the motor to said voltage input for fall speed operation; and
   a control circuit for electrically connecting the voltage input directly to the motor and for electrically disconnecting said inverter from said motor, said control circuit including timing means for generating a time delay to control said first and second relays in a break-before-make format so that said first and second relays are never closed at the same time.

8. A controller as set forth in claim 7 wherein said inverter is a half-bridge inverter.

9. A controller as set forth in claim 8 wherein said half-bridge inverter includes no more than two power switches.

10. A controller as set forth in claim 7, and further comprising a microcontroller and a pulse width modulator for generating a non-linear voltage-to-frequency relationship for operating said inverter.

11. A controller as set forth in claim 10 wherein said non-linear voltage-to-frequency relationship is a quadratic relationship.

12. A controller as set forth in claim 7 wherein, when switching from low speed operation to full speed operation, said time delay is approximately one-hundred milliseconds.

13. A controller as set forth in claim 7 wherein, when switching from full speed operation to low speed operation, said time delay is approximately three seconds.

14. A controller for an electric motor, said controller comprising:
   a voltage input;
   an half-bridge inverter connected to said voltage input and to the motor to provide low speed excitation to the motor;
   a first relay for connecting the motor to said half-bridge inverter for low speed operation;
   a second relay for connecting the motor to said voltage input for full speed operation;
   a microcontroller and a pulse width modulator for generating a quadratic voltage-to-frequency relationship for operating said inverter; and
   a control circuit for electrically connecting the voltage input directly to the motor and for electrically disconnecting said half-bridge inverter from said motor, said control circuit including timing means for generating a time delay to control said first and second relays in a break-before-make format so that said first and second relays are never closed at the same time, and so that, when switching from low speed operation to fill speed operation, said time delay is approximately one-hundred milliseconds, and, when switching from fill speed operation to low speed operation, said time delay is approximately three seconds.

15. A method of controlling an electric motor using a motor controller, said method comprising:
   providing one source of unregulated electrical power selectively connected to the motor through a first relay;
   generating a second source of regulated electrical power having a non-linear voltage-to-frequency relationship, the second source being selectively connected to the motor through a second relay; and
   selectively switching the relays to connect the motor to the one source for full speed operation, and to the second source for operation of the motor at speeds less than the full speed, wherein said switching includes generating a time delay of approximately one-hundred milliseconds when switching from low speed operation to full speed operation, and generating a time delay of approximately three seconds when switching from full speed operation to speeds less that the full speed.

16. A method as set forth in claim 15 wherein said on source of unregulated electrical power is conventional line power.

17. A method as set forth in claim 15 wherein said generating includes providing a half-bridge inverter connected to said one source of unregulated electrical power.

18. A method as set forth in claim 15 wherein said non-linear voltage-to-frequency is a quadratic relationship.

19. A method of controlling an electric motor using a motor controller, said method comprising:
   providing one source of unregulated electrical power selectively connected to the motor through a first relay; and generating a second source of regulated electrical power having a quadratic voltage-to-frequency relationship, the second source being selectively connected to the motor through a second relay.

20. A method as set forth in claim 19, and refer comprising selectively switching the relays to connect the motor to said one source for full speed operation, and to said second source for operation of the motor at speeds less than the full speed.

21. A method as set forth in claim 20, wherein said switching includes generating a time delay to control said first and second relays in a break-before-make format so that said first and second relays are never closed at the same time.

22. A method as set forth in claim 21, wherein said switching includes generating a time delay of approximately one-hundred milliseconds when switching from low speed operation to full speed operation, and generating a time delay of approximately three seconds when switching from full speed operation to speeds less that the full speed.

23. A method as set forth in claim 19, wherein said one source of unregulated electrical power is conventional line power.

24. A method as set forth in claim 19, wherein said generating includes providing a half-bridge inverter connected to said one source of unregulated electrical power.

25. A method as set forth in claim 24, wherein said half-bridge inverter includes no more than two power switches.

26. A method as set forth in claim 19, wherein said generating further includes providing a microcontroller and a pulse width modulator for generating said quadratic voltage-to-frequency relationship for operating said half-bridge inverter.

* * * * *